(12) United States Patent
Lin et al.

(10) Patent No.: US 12,424,532 B2
(45) Date of Patent: Sep. 23, 2025

(54) BUMP JOINT STRUCTURE WITH DISTORTION AND METHOD FORMING SAME

(71) Applicant: Taiwan Semiconductor Manufacturing Co., Ltd., Hsinchu (TW)

(72) Inventors: Po-Yao Lin, Zhudong Township (TW); Shin-Puu Jeng, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 18/668,922

(22) Filed: May 20, 2024

(65) Prior Publication Data

US 2024/0304533 A1   Sep. 12, 2024

Related U.S. Application Data

(60) Continuation of application No. 17/813,820, filed on Jul. 20, 2022, now Pat. No. 12,021,014, which is a
(Continued)

(51) Int. Cl.
*H01L 23/498* (2006.01)
*G06F 30/3953* (2020.01)
(Continued)

(52) U.S. Cl.
CPC .... *H01L 23/49816* (2013.01); *G06F 30/3953* (2020.01); *H01L 24/16* (2013.01);
(Continued)

(58) Field of Classification Search
None
See application file for complete search history.

(56) References Cited

U.S. PATENT DOCUMENTS 7,569,935 B1 * 8/2009 Fan .................. H01L 24/16
257/737
8,558,379 B2 * 10/2013 Kwon ............ H01L 23/3178
257/737
(Continued)

FOREIGN PATENT DOCUMENTS

CN    103594443 A    2/2014
CN    104299920 A    1/2015
(Continued)

*Primary Examiner* — Hung K Vu
(74) *Attorney, Agent, or Firm* — Slater Matsil, LLP

(57) ABSTRACT

A structure includes a first package component including a first conductive pad, and a second package component overlying the first package component. The second package component includes a surface dielectric layer, and a conductive bump protruding lower than the surface dielectric layer. The first conductive bump includes a first sidewall facing away from a center of the first package component, and a second sidewall facing toward the center. A solder bump joins the first conductive pad to the first conductive bump. The solder bump contacts the first sidewall. An underfill is between the first package component and the second package component, and the underfill contacts the second sidewall.

20 Claims, 10 Drawing Sheets

Related U.S. Application Data division of application No. 16/942,141, filed on Jul. 29, 2020, now Pat. No. 11,488,898.

(60) Provisional application No. 63/015,770, filed on Apr. 27, 2020.

(51) Int. Cl.
    *H01L 23/00*     (2006.01)
    *G06F 119/18*     (2020.01)

(52) U.S. Cl.
    CPC .......... *H01L 24/81* (2013.01); *G06F 2119/18* (2020.01); *H01L 2224/81815* (2013.01); *H01L 2924/3512* (2013.01); *H01L 2924/3841* (2013.01)

(56) References Cited

U.S. PATENT DOCUMENTS

| | | | |
|---|---|---|---|
| 8,853,853 | B2 | 10/2014 | Chang et al. |
| 9,478,482 | B2 | 10/2016 | Zhang et al. |
| 10,141,280 | B2 | 11/2018 | Chen |
| 10,658,300 | B2 * | 5/2020 | Kim .................... H01L 23/5386 |
| 2002/0155637 | A1 * | 10/2002 | Lee ...................... H05K 3/3436 |
| | | | 257/E21.511 |
| 2009/0243080 | A1 | 10/2009 | Pendse et al. |
| 2012/0306073 | A1 * | 12/2012 | Yu ........................... H01L 24/13 |
| | | | 257/737 |
| 2014/0048929 | A1 | 2/2014 | Cha et al. |
| 2014/0377946 | A1 | 12/2014 | Cha et al. |
| 2015/0228587 | A1 | 8/2015 | Cheng et al. |
| 2017/0120396 | A1 * | 5/2017 | Ohashi ............... B23K 35/3612 |
| 2020/0098714 | A1 | 3/2020 | Cha et al. |

FOREIGN PATENT DOCUMENTS

| | | |
|---|---|---|
| DE | 102013019277 A1 | 5/2014 |
| KR | 20190087897 A | 7/2019 |
| TW | 201306208 A | 2/2013 |
| TW | 201903991 A | 1/2019 |

\* cited by examiner

BUMP JOINT STRUCTURE WITH DISTORTION AND METHOD FORMING SAME

PRIORITY CLAIM AND CROSS-REFERENCE

This application is a continuation of U.S. patent application Ser. No. 17/813,820, entitled "Bump Joint Structure with Distortion and Method Forming Same," and filed Jul. 20, 2022, which is a divisional of U.S. patent application Ser. No. 16/942,141, entitled "Bump Joint Structure with Distortion and Method Forming Same," and filed Jul. 29, 2020, now U.S. Pat. No. 11,488,898, issued Nov. 1, 2022, which claims the benefit of the U.S. Provisional Application No. 63/015,770, filed on Apr. 27, 2020, and entitled "Novel Bump Joint Structure with Small Dislocation Between C4 Bump and Package Substrate Pad and Method of Forming the Same," which applications are hereby incorporated herein by reference.

BACKGROUND

Integrated Circuit packages may include a plurality of package components bonded together. In recent development of applications, High-Performance Computing (HPC) packages were made, which typically include very large package substrates and interposers. The package substrates and interposers may include a plurality of layers. This compounded with the significant structure and material differences between the package substrate and the interposer, and their large sizes resulted in a significant difference in thermal expansion between package substrates and the overlying package components. Problems such as cold joint and bridging may be resulted.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
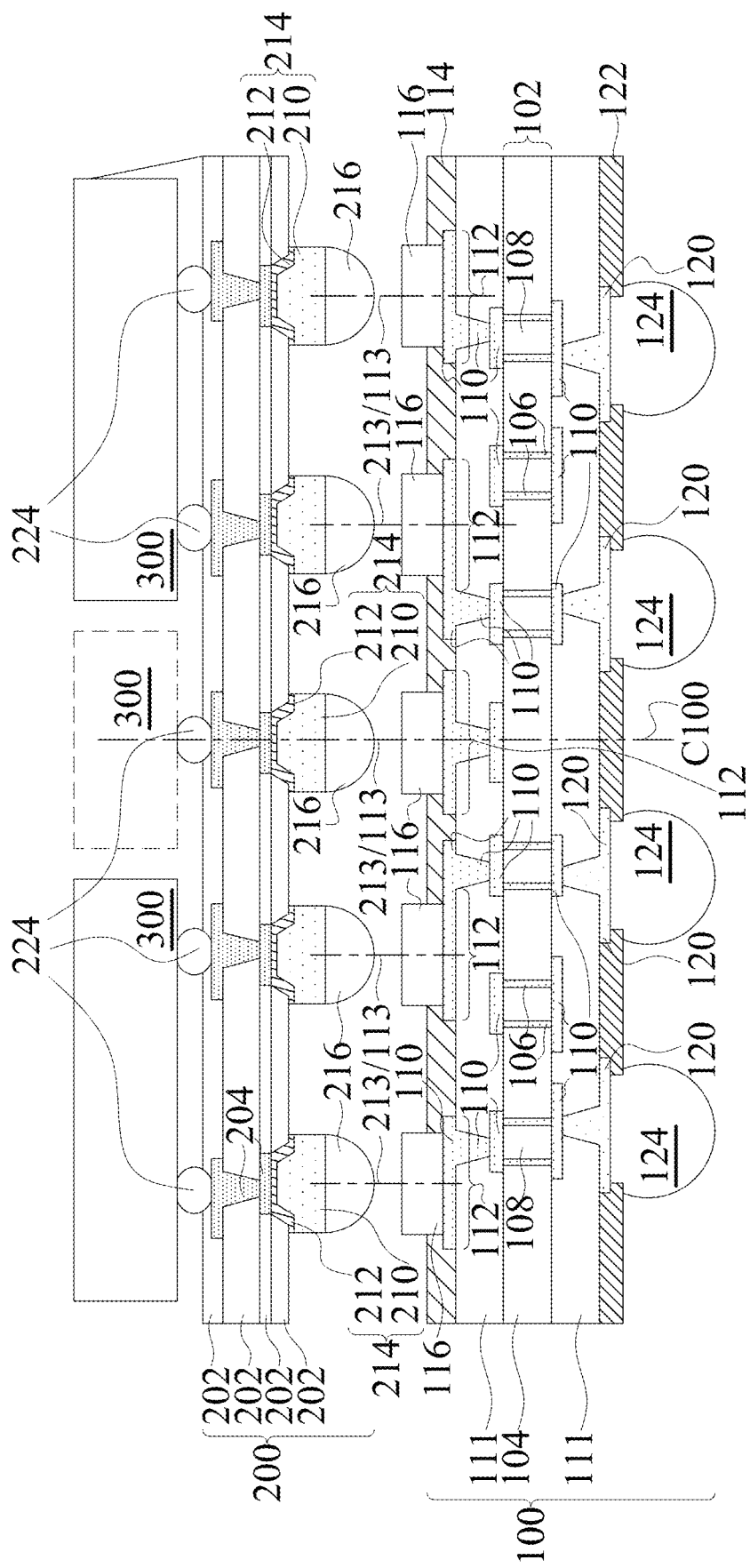
FIG. 1 illustrates a first design of a first package component and a second package component to be bonded together in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A package with electrical connectors having misalignments between the bonded electrical connectors and the method of forming the same are provided in accordance with some embodiments. In an example process for forming the package, the expected misalignment values between the first electrical connectors in a first package component and second electrical connectors in a second package component are first determined. A fraction of the misalignment values is allocated as pre-shift values, and the designs of the first and/or the second package components are revised, so that the first electrical connectors are pre-shifted relative to the corresponding second electrical connectors. The "pre-shift" is such named because it is before the reflow for bonding the first and the second package components together. Since the pre-shift values are smaller than the corresponding expected misalignment values, after the reflow process, the first electrical connectors of the first package component and the corresponding second electrical connectors in the second package component are still misaligned, which may help to reduce the strain in solder regions. For any connected first and second electrical connectors, a distance of the first electrical connector should be greater than a distance of second electrical connector from a die center. Accordingly, solder covers part of one side of the first electrical connector in the bump distortion structure to reduce strain. The present disclosure ensures better chip-package interaction (CPI) reliability performance better than no distortion bump, as larger solder volume on high strain side can effectively reduce strain to prevent bump crack.

Embodiments discussed herein are to provide examples to enable making or using the subject matter of this disclosure, and a person having ordinary skill in the art will readily understand modifications that can be made while remaining within contemplated scopes of different embodiments.

Throughout the various views and illustrative embodiments, like reference numbers are used to designate like elements. Although method embodiments may be discussed as being performed in a particular order, other method embodiments may be performed in any logical order.

Figure 7:
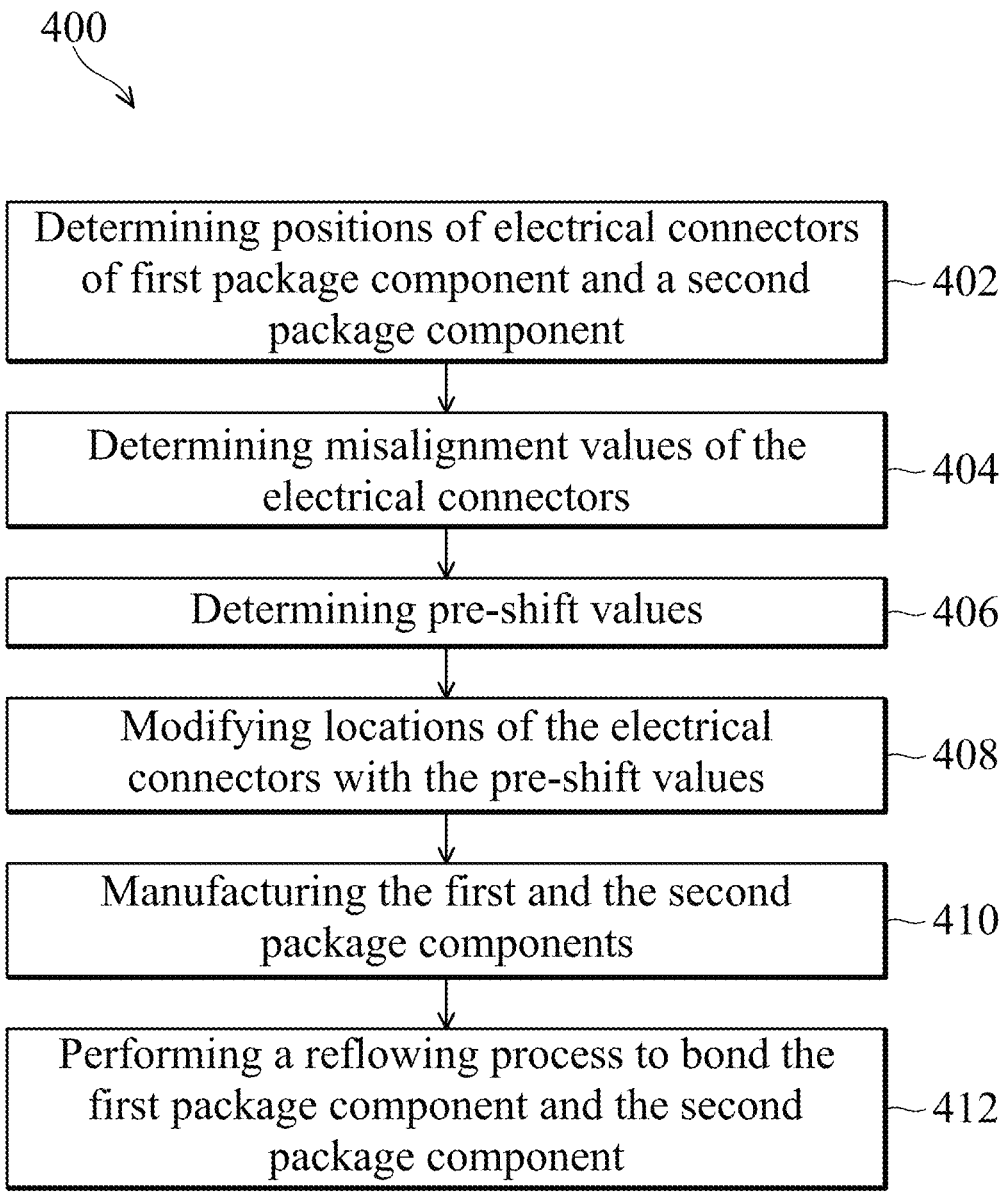
FIG. 7 illustrates a process flow for designing and forming a package in accordance with some embodiments.

FIGS. 1, 2A, 2B, 3A, 3B, 4A, and 4B illustrate the cross-sectional views and plane views of intermediate stages in the design and formation of a package in accordance with some embodiments of the present disclosure. The corresponding processes are also reflected schematically in the process flow 400 as shown in FIG. 7.

FIG. 1 illustrates the cross-sectional view of package components in accordance with some embodiments. The package components include package component 100 and 200, which are to be bonded together through solder bonding. It is appreciated that package components 100 and 200 may be physical components that have already manufactured, or may be the designs of these package components, which have not been manufactured. In accordance with some embodiments of the present disclosure, the package components 100 and 200 are to be bonded to form a High-Performance Computing (HPC) package, which may be used in performance-demanding applications such as Artificial Intelligence (AI) applications.

In accordance with some embodiments, package component 100 is or comprises a package substrate, which may be a cored package substrate or a coreless package substrate. Package component 100 may also be or comprise a printed circuit board, a package, or the like. When being or comprising a cored package substrate, package component 100 includes core 102, which includes core dielectric 104, conductive pipes 106 penetrating through core dielectric 104, and dielectric filling material 108 inside conductive pipes 106. In accordance with some embodiments, core dielectric 104 is formed of one or more material selected from epoxy, resin, glass fiber, prepreg (which comprises epoxy, resin, and/or glass fiber), glass, molding compound, plastic, combinations thereof, and multi-layers thereof. Dielectric layers 11 may be formed of or comprise polymers, prepreg, glass fiber, or the like. RDLs 11o are formed in dielectric layers in, and are electrically interconnected through conductive pipes 106. In accordance with some embodiments, RDLs 11o are formed of or comprise copper, aluminum, titanium, nickel, gold, or the like, alloys thereof, or multi-layers thereof.

Electrical connectors 112 are formed on the top surface of package component 100. In accordance with some embodiments electrical connectors 112 are bond pads. Dielectric layer 114 may be formed to cover the edge portions of electrical connector 112 when electrical connectors 112 are bond pads. The central portions of electrical connectors 112 are revealed through the openings in dielectric layer 114. In accordance with alternative embodiments, electrical connectors 112 include metal bumps that protrude higher than the top surfaces of dielectric layer 114. The metal bumps may be formed of copper, and may or may not include layers formed of other metal(s) or metal alloys including nickel, palladium, or the like. Dielectric layer 114 may be formed of solder mask, or polymers such as polybenzoxazole (PBO), polyimide, benzocyclobutene (BCB), or the like. In accordance with some embodiments, solder regions (also referred to as solder bumps hereinafter) 116 are pre-formed to join to electrical connectors 112. Solder regions 116 are thus referred to as pre-solder regions 116 hereinafter.

In accordance with some embodiments, electrical connectors 120 are formed on the bottom side of package component 100, and are electrically connected to electrical connectors 112 through conductive pipes 106 and RDLs 110. Dielectric layer 122 may mask the edge portions of electrical connectors 120. Solder regions 124 are formed to join to electrical connectors 120.

In accordance with alternative embodiments, package component 100 is a coreless package component, which is free from the core, and includes a plurality of redistribution lines (similar to RDLs 110) formed in a plurality of dielectric layers.

Package component 200, which is to be bonded to package component 100, is also formed. In accordance with some embodiments, package component 200 is or comprises an interposer, which may be a semiconductor interposer, an organic interposer, or the like. When comprising a semiconductor interposer, the interposer may include a semiconductor substrate such as a silicon substrate, and through-vias (sometimes referred to as through-silicon vias) penetrating through the semiconductor substrate. Dielectric layers, metal lines, and vias are formed on the opposing sides of the semiconductor substrate, and are interconnected through the through-vias. The dielectric layers may be formed of or comprise low-k dielectric layers, silicon oxide, silicon nitride, silicon oxynitride, or the like. When being an organic interposer, package component 200, as schematically illustrated in FIG. 1, may include a plurality of dielectric layers 202, and redistribution lines 204 in dielectric layers 202. In accordance with some embodiments, dielectric layers 202 are formed of organic materials such as polyimide, PBO, BCB, or the like.

In accordance with some embodiments, package component 200 includes electrical connectors 214, which may include Under-Bump Metallurgies (UBMs) 212 and conductive bumps 210. UBMs 212 may comprise an adhesion layer such as a titanium layer, a copper layer, or a composite layer including a copper layer on the titanium layer. Conductive bumps 210 may be formed copper, nickel, palladium, gold, combinations thereof, and multi-layers thereof. Solder regions 216 may be formed on electrical connectors 214. Solder regions 216 may not extend on the sidewalls of electrical connectors 214 in accordance with some embodiments.

In accordance with some embodiments, package component(s) 300 are bonded to package component 200 through solder regions 224. Package components 300 may include one or more package that is formed through a packaging process, and the package(s) may include logic dies (such as computing dies), memory dies (such as Dynamic Random Access Memory (DRAM) dies or Static Random Access Memory (SRAM) dies), photonic dies, packages (including device dies that have already been packaged), Input-output (IO) dies, digital dies, analog dies, surface-mount passive devices, or the like. The die(s) in package components 300 may be encapsulated in one or more encapsulant such as molding compound, underfill, epoxy, resin, or the like. In accordance with some embodiments of the present disclosure, package components 300 include a System-on-Chip (SoC) die, which is a package including device dies bonded together to form a system. Package components 300 may also include High-Bandwidth Memory (HBM) stacks, with each of the HBM stacks including a plurality of memory dies stacked together to form the memory stack. The memory dies may be DRAM dies, SRAM dies, or other types of memory dies.

In accordance with some embodiments, one of the electrical connectors 214 is aligned to the center C100 of package component 100, and the electrical connector 214 is referred to as center electrical connector 214 hereinafter. The center of package component 200 may be vertically aligned to, or may be offset from, center C100. There may be a package component 300 having an electrical connector 224 electrically coupling to the electrical connector 214. In accordance with alternative embodiments, there is no electrical connector 214 and/or package component 300 aligned to the center C100. Accordingly, the package component 300 aligned to center C100 is illustrated as dashed to indicate it may or may not exist.

In accordance with some embodiments, in the initial designs of package components 100 and 200, the locations of electrical connectors 214 are designed as aligning to the corresponding electrical connectors 112 with a one-to-one correspondence. Throughout the description, each of the electrical connectors 112 and its corresponding electrical connector 214 are intended to be bonded together, and are collectively referred to as an electrical connector pair 112/214. Accordingly, package components 100 and 200 have a plurality of electrical connector pairs. Throughout the description, the terms "correspond" and "corresponding," when referring to electrical connectors, refer to the electrical connectors that form electrical connector 112/214 pairs, and are intended to be bonded together. Alternatively stated, the electrical connectors 112 and 214 in the same electrical connector pair are "corresponding" electrical connectors. Furthermore, the centers of electrical connectors 112 and 214 in the same electrical connector pair are referred to as "corresponding" centers hereinafter. In the initial designs, the centers 213 of electrical connectors 214 are vertically aligned to the centers 113 of the corresponding electrical connectors 112 with a one-to-one correspondence. In the description, the term "corresponding" may be interchangeably used as the term "respective."

Figure 2A:
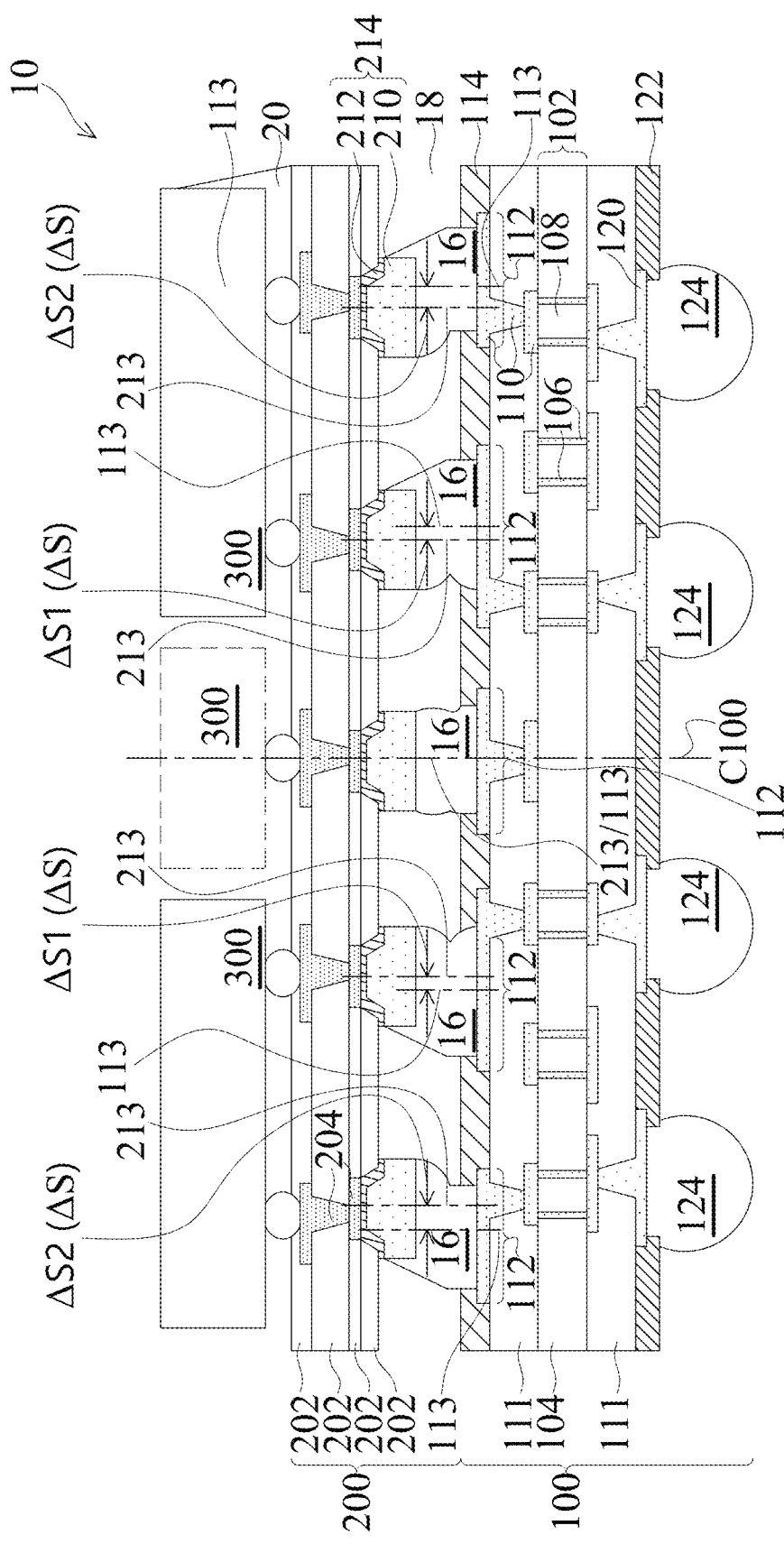
FIGS. 2A and 2B illustrate the expected misalignment of the electrical connectors in the first package component from the electrical connectors in the second package component in response to a reflow process in accordance with some embodiments.
Figure 2B:
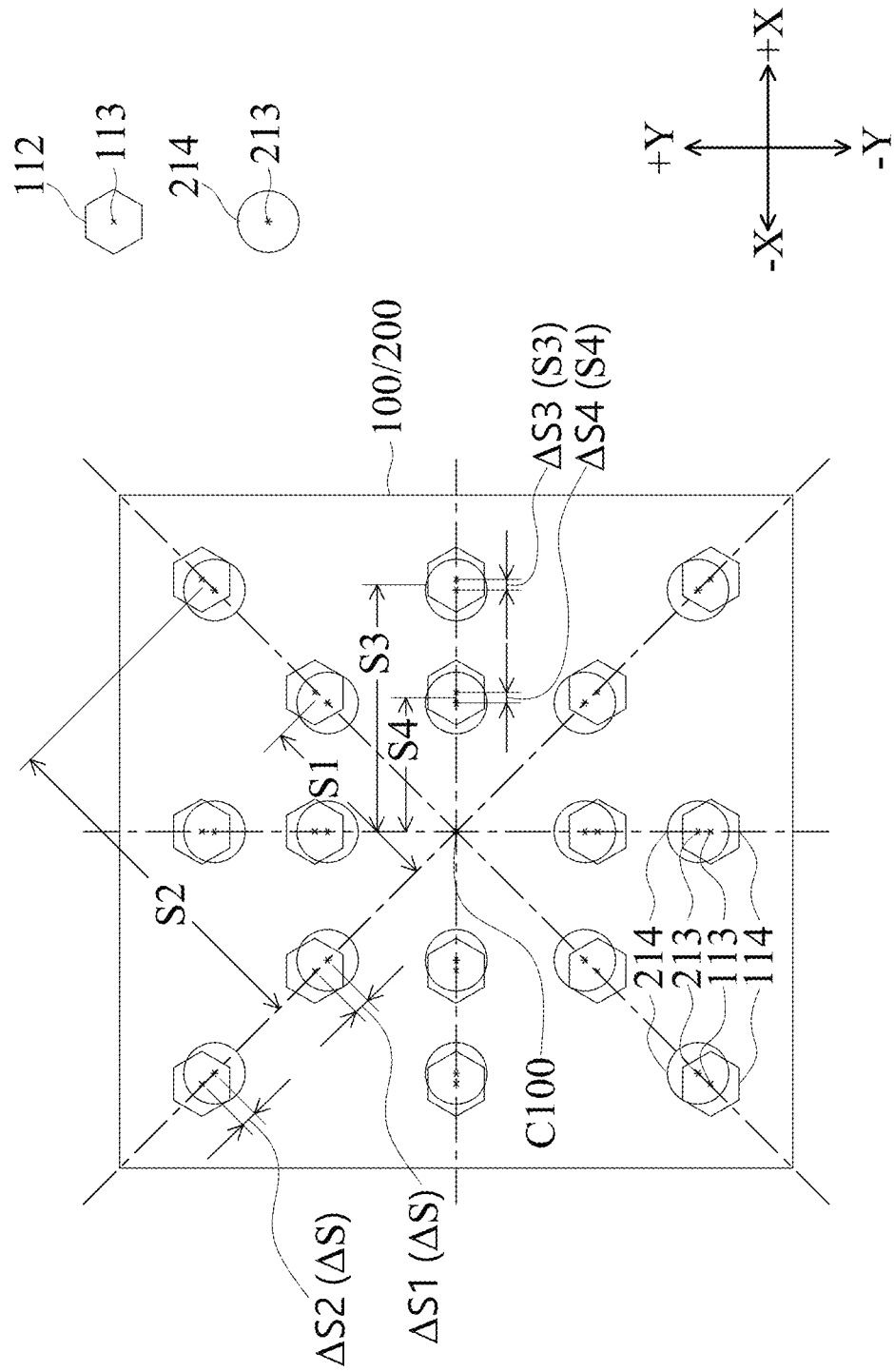

With the package components 100 and 200 being provided, the positions of each of the electrical connector pairs 112/214 are first determined, for example, by recording their X and Y coordinates (as shown in FIG. 2B). The respective process is illustrated as process 402 in the process flow 400 as shown in FIG. 7.

FIG. 2A illustrates the bonding of package component 200 to package component 100 through a reflow process, in which solder regions 116 and 216 (FIG. 1) are molten to generate solder regions 16. Package 10 is thus formed. In accordance with some embodiments, the Coefficient of Thermal Expansion (CTE) CTE100 of package component 100 is greater than the overall CTE CTE200 of package component 200 and the CTE300 of package component 300. For example, package component 100 overall may have a CTE in a range between about 12 ppm/K and about 20 ppm/K, and the overall CTE CTE200 of package component 200 and the overall CTE CTE300 of component 300 are in the range between about 3 ppm/K and about 10 ppm/K. It is appreciated that in the illustrated example embodiments, CTE CTE100 is assumed to be greater than CTE CTE200 as an example, while in other embodiments, CTE CTE100 may also be smaller than CTE CTE200, and the teaching of the present disclose still applies. In the reflow process, both of package components 100 and 200 expand, and electrical connectors 112 and 214 are laterally farther away from center C100 of package component 100 than before the reflow process. Due to the greater CTE CTE100 than the CTE CTE200 in the example embodiments, package component 100 expands more than package component 200. Centers 113 of electrical connectors 112 are thus shifted outwardly (away from center C100) from the corresponding centers 213 by misalignment values ΔS (which include ΔS1, ΔS2, etc.). It is appreciated that misalignment values ΔS are related to the positions of the corresponding electrical connectors 112 and 214, and the farther away from center C100 the electrical connector pairs 112/214 are, the greater the misalignment values ΔS are. For example, in FIG. 2A, ΔS2 is greater than ΔS1. When there is a center electrical connector pair 112/214 at the center C100, it is expected that the centers 113 and 213 of the center electrical connector pair 112/214 have no misalignment.

The misalignment value ΔS of each of the electrical connector pairs 112/214 is determined. The respective process is illustrated as process 404 in the process flow 400 as shown in FIG. 7. Each of the misalignment values ΔS includes a component in the X-directions (FIG. 2B) and a component in the Y-directions. Some of misalignment values ΔS may have the same magnitude, and when the directions (+X, −X, +Y, and −Y) are considered, all of the misalignment values are different from each other because the misalignment values with the same magnitudes have different directions. In accordance with some embodiments, package components 100 and 200 are manufactured as physical package components, and hence an actual reflow process is performed, and the misalignment values ΔS are determined through measurement on package 10 that has already been manufactured. In accordance with alternative embodiments, the package components 100 and 200 are designs, and are not manufactured. Accordingly, package 10 is simulated, and the misalignment values ΔS of the electrical connector pairs 112/214 are determined through simulation. For example, the materials, the structures, and the sizes of package components 100 and 200 are used as input parameters for the simulation. Also, the sizes and the locations of electrical connector pairs 112/214 (such as their distances from center C100) are also used in the simulation to determine the misalignment values ΔS. In accordance with some embodiments, package 10 includes package components 300, and the misalignment values ΔS are also affected by the CTEs of package component 300. In accordance with alternative embodiments, package 10 includes package component 200 and does not include package component 300. Accordingly, the misalignment values ΔS are not affected by the CTEs of package components 300.

FIG. 2B illustrates a top view of the package 10 as shown in FIG. 2A. For distinguish purpose, in FIG. 2B and subsequent figures, electrical connectors 112 are shown as having hexagonal top-view shapes as an example, while electrical connectors 214 are shown as having circular top-view shapes as an example, while electrical connectors 112 and 214 may have any other top-view shapes including, and not limited to, circles, hexagons, rectangles, ovals, octagons, etc. In accordance with some embodiments, package components 100 and 200 are essentially homogeneous, which means the features on different parts of packages have similar properties such as CTEs. Accordingly, electrical connectors 112 out-shift from the respective bonding electrical connectors 214 in the directions away from center C100. Alternatively stated, for any electrical connector pair 112/214, after the reflow, the corresponding centers 213 and 113 may be aligned to a straight line extending from center C100 toward centers 213 and 113, and center 113 is farther away from center C100 than the corresponding center 213. The shifting of centers 113 from the corresponding centers 213 thus will be in a radius pattern, with center C100 as being the center of the radius pattern.

Furthermore, the misalignment values ΔS of electrical connector pairs 112/214 may be proportional to their distance values from center C100. For example, in FIG. 2B, ratio ΔS2/S2 is equal to ratio ΔS1/S1, and is equal to ratios ΔS3/S3 and ΔS4/S4. In accordance with some embodiments, the misalignment value of an electrical connector pair 112/214 may be determined using Equation 1 as follows:

$$\Delta S = S * (CTE_{100} - CTE_{200}) * TempR \qquad \text{[Equation 1]}$$

Wherein S is the distance of the electrical connector pair 112/214 from center C100, and ΔS is the misalignment value of the electrical connector pair 112/214 after the reflow. Value TempR (with the unit "K") is an index, which may be related to the temperature at which solder regions 16 start to solidify after its reflow.

Figure 3A:
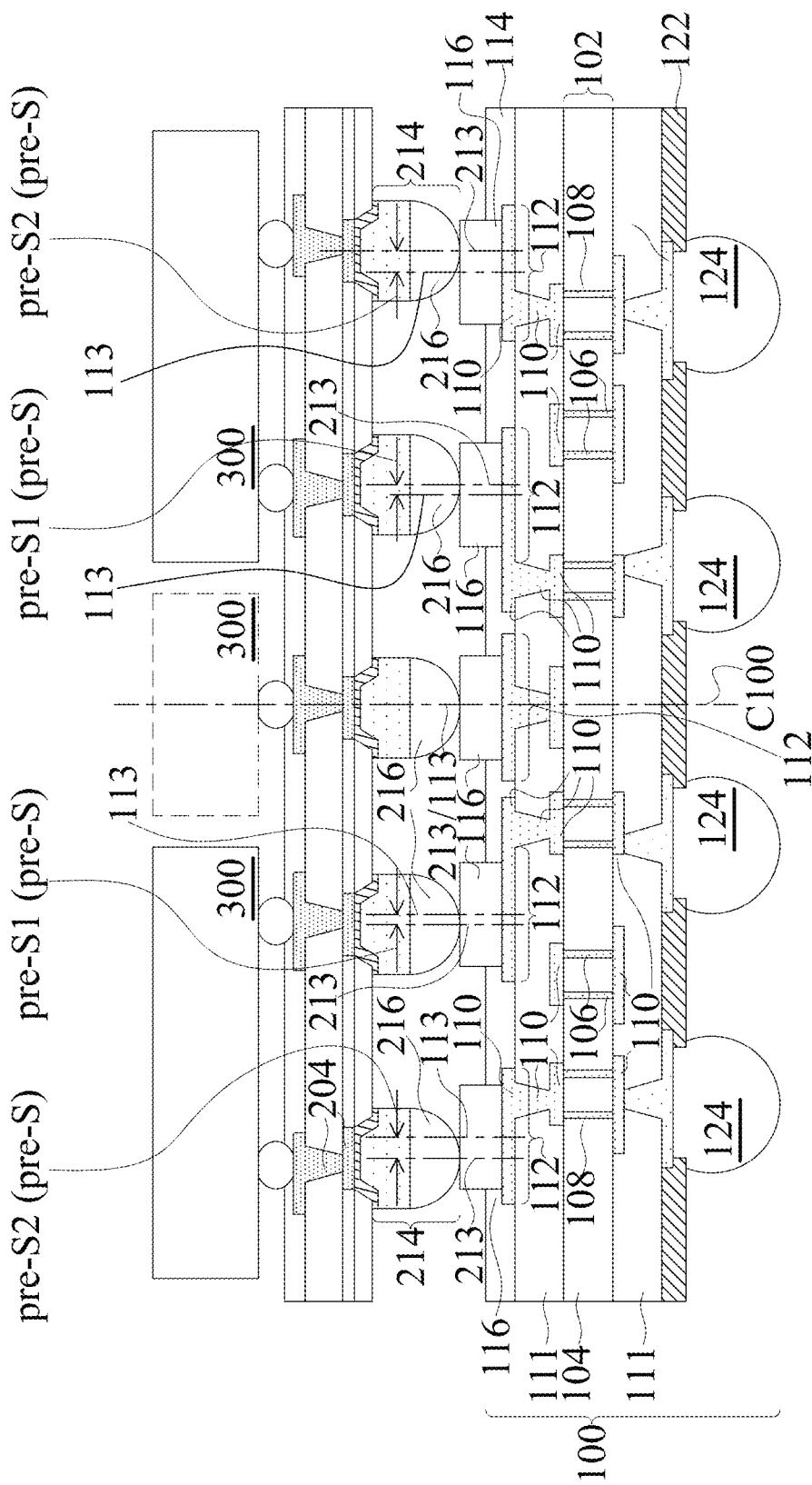
FIGS. 3A and 3B illustrate a cross-sectional view and a plane view, respectively, of the pre-shifting of electrical connectors in the first and the second package components in accordance with some embodiments.
Figure 3B:
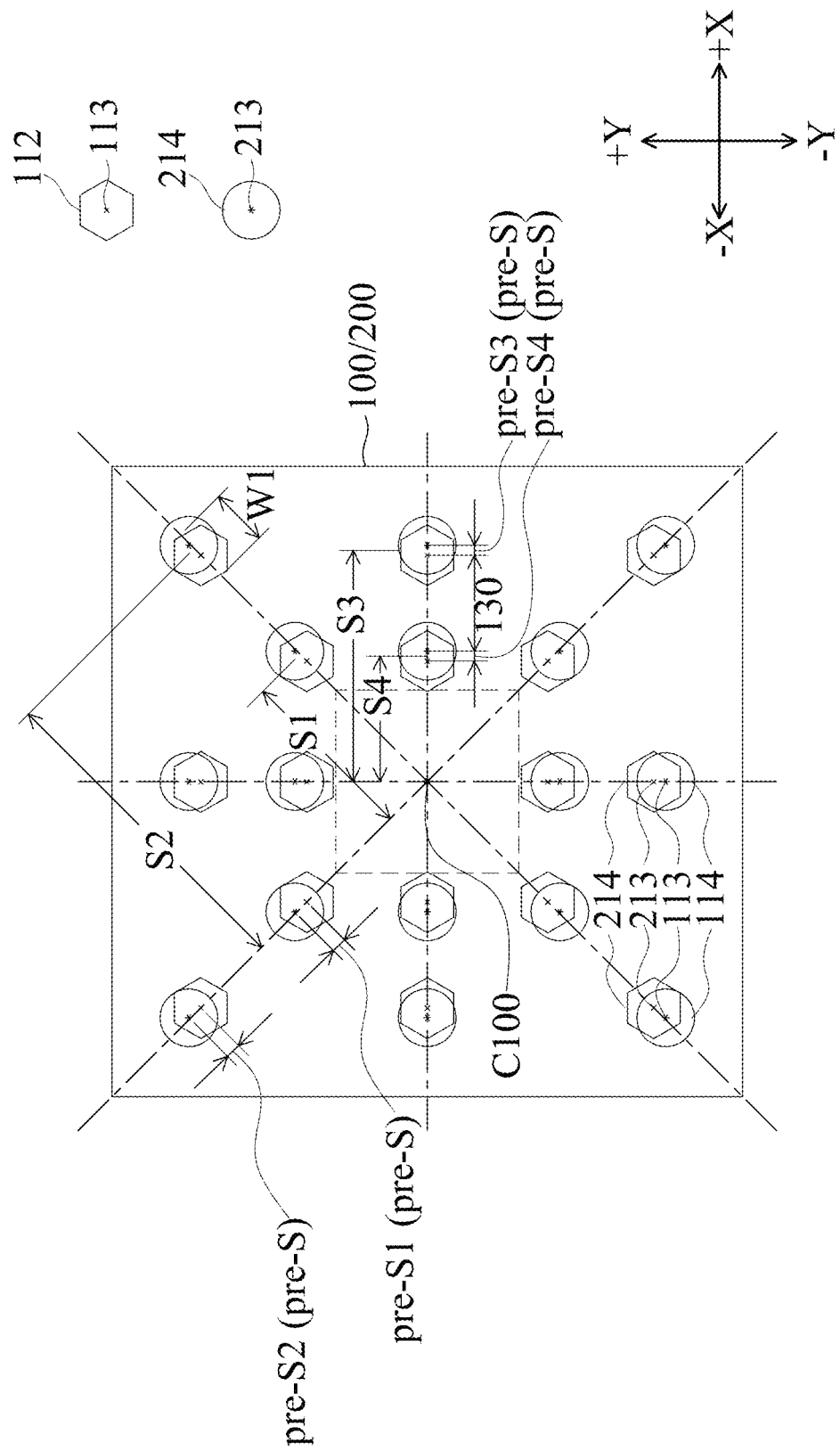

Based on the determined misalignment values ΔS of the electrical connector pairs 112/214, either one, or both, of package components 100 and 200 is redesigned, and the locations of the electrical connectors 112 and/or 214 are modified. FIG. 3A illustrates a cross-sectional view of the re-designed package components 100 and 200. For example, the locations of electrical connectors 112 and 214 in the same electrical connector pair are shifted relative to each other by pre-shift values pre-S (including pre-S1, pre-S2, etc.). Each of pre-shift values pre-S also has components in the X-directions (+X the −X direction) and Y-directions (+Y and −Y direction), as shown in FIG. 3B. The term "pre-shift" indicates that shift exists and is generated before the reflow process for bonding package components 100 and 200.

The pre-shift value pre-S for each of the electrical connector pairs 112/214 is first determined. The respective process is illustrated as process 406 in the process flow 400 as shown in FIG. 7. In accordance with some embodiments, package components 100 and 200 are essentially homogeneous. Accordingly, as aforementioned and shown in FIG. 2B, the misalignment values ΔS are proportional to the distances of the corresponding electrical connector pairs 112/214 to center C100. The pre-shift values pre-S are calculated as being a fraction of the determined misalignment values ΔS. For example, the following equations may be used to determine the pre-shift values pre-S:

$$Pre-S = A * \Delta S \qquad \text{[Equation 2]}$$

Wherein pre-shift factor A is smaller than 1.0, and may be in the range between about 0.5 and about 0.7. The significance of the pre-shift factor A is discussed in subsequent paragraphs. Since pre-shift factor A is smaller than 1.0, it means the pre-shift value is smaller than the corresponding misalignment value ΔS. It is appreciated that since misalignment value of ΔS has components in the +X/−X and +Y/−Y directions, the pre-shift values pre-S also have components in the +X/−X and +Y/−Y directions. Accordingly, the shift values pre-S not only include the magnitude of the shifting, but also the directions of the shifting.

In accordance with alternative embodiments, instead of having the pre-shift values Pre-S being proportional to misalignment values, the pre-shift values Pre-S is calculated as being allowing the post-reflow misalignment values post-M (FIGS. 4A and 4B) to have a fixed pre-determined value, which may be in the range between about ⅕ and about ¼ of the critical dimension W1 (FIG. 4B) of electrical connectors 214. Accordingly, the following equation is used to determine the pre-shift values pre-S:

$$Pre-S = \Delta S - (\text{predetermined } Post-M) \qquad \text{[Equation 3]}$$

It is appreciated that Equation 3 applies to the electrical connector pair 112/214 whose misalignment values ΔS are equal to or greater than the pre-determined value. For the electrical connector pair 112/214 whose misalignment values ΔS are smaller than the pre-determined value, the pre-shift values of the corresponding electrical connector pair 112/214 may be set to zero (no pre-shift).

With the pre-shift value of each of the electrical connector pairs 112/214 determined, package components 100 and 200 are redesigned, and the locations of the electrical connectors 112 and/or 214 are modified to implement the pre-shift values. The respective process is illustrated as process 408 in the process flow 400 as shown in FIG. 7. The corresponding package components 100 and 200 with the modified designs are shown in FIGS. 3A and 3B. In accordance with some embodiments, package component 100 is re-designed and the locations of electrical connectors 112 are modified, so that the centers 113 of electrical connectors 112 are shifted toward center C100 by the corresponding pre-shift value pre-S. As a result, centers 113 of electrical connectors 112 are laterally spaced away from the corresponding center 213 of the corresponding electrical connector 214 by pre-shift values pre-S (including pre-S1, pre-S2, etc.).

In accordance with alternative embodiments, package component 200 is re-designed, so that the centers 213 of electrical connectors 214 are shifted away from center C100 by pre-shift values pre-S (including pre-S1, pre-S2, etc.). As a result, centers 213 of electrical connectors 214 are also laterally spaced away from centers 113 of the corresponding electrical connectors 112 by pre-shift values pre-S1, pre-S2, etc. In accordance with yet alternative embodiments, both of package components 100 and 200 are re-designed to implement the pre-shift values pre-S ΔS1, ΔS2, etc. It is understood that in the structure shown in FIG. 3A, package component 200 is merely placed on package component 100, and has not been bonded to package component 100 through a reflow process yet.

FIG. 3B illustrates a plane view (a top view, for example) of the redesigned package components 100 and 200 and the positions of electrical connectors 112 and 214 in accordance with some embodiments. Assuming the center C100 of package component 100 and the center of package component 200 are aligned (overlap), centers 113 of electrical connectors 112 are pre-shifted toward center C100 relative to the center 213 of the corresponding electrical connectors 214.

In accordance with some embodiments, all of the electrical connector pairs 112/214 in package components 100 and 200 are pre-shifted. If, however, there is an electrical connector pair 112/214 right at center C100, no pre-shift will be performed on the center electrical connector pair 112/214. In accordance with alternative embodiments, package component 100 has center region 130 including center C100 therein. Center region 130 may also be symmetrical relative to center C100. For example, center region 130 may be a rectangular region with its width and length smaller than about 25 percent (or about 20 percent) of the corresponding width and length of package component 100. Center region 130 may also be a circular region centered at C100, and with its diameter smaller than about 25 percent (or about 20 percent) of the larger one of the width and length of package component 100. In accordance with some embodiments, all of the electrical connector pairs 112/214 inside center region 130 are not pre-shifted, while all of the electrical connector pairs 112/214 outside of center region 130 are pre-shifted. The reason not to pre-shift the electrical connector pairs in center region 130 is that the misalignment values ΔS in center region 130 is too small to cause the problems such as cold joint and bridging. On the other hand, not pre-shifting the electrical connector pairs 112/214 in center region 130 may advantageously result in the corresponding solder regions to have greater post-shift values (as will be discussed in subsequent paragraphs), and hence the solder regions 16 have a greater chance of climbing on the outer sidewalls of electrical connectors 214.

Figure 4A:
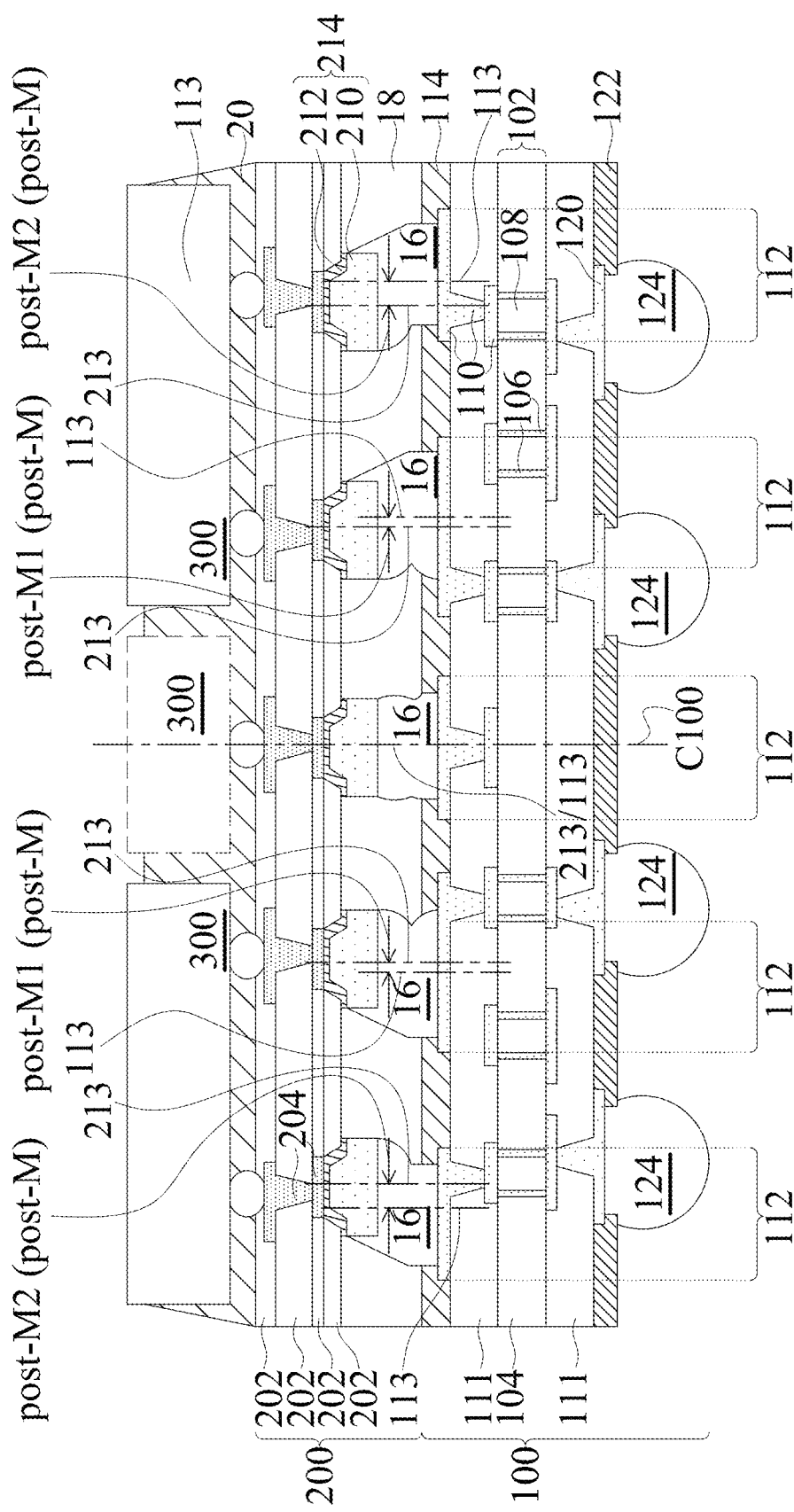
FIGS. 4A and 4B illustrate a cross-sectional view and a plane view, respectively, of the misalignment of electrical connectors in the first and the second package components after a reflow process in accordance with some embodiments.
Figure 4B:
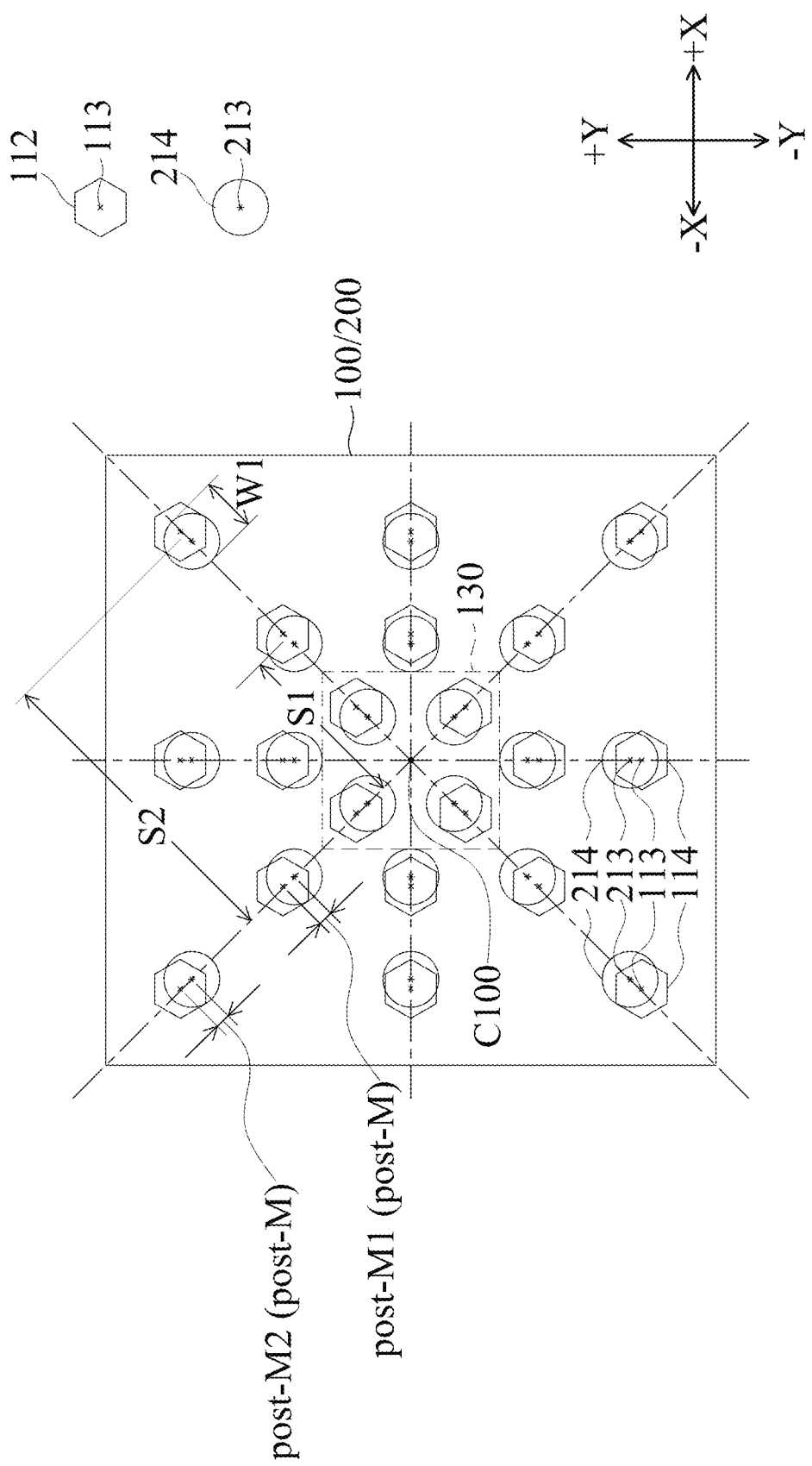

The re-designed package components as shown in FIGS. 3A and 3B are then manufactured as physical and tangible components. The respective process is illustrated as process 410 in the process flow 400 as shown in FIG. 7. Next, the manufactured package components 100 and 200 are bonded to each other through a reflow process. The respective process is illustrated as process 412 in the process flow 400 as shown in FIG. 7. The resulting package 10' is shown in FIGS. 4A and 4B, which illustrate a cross-sectional view and a top view, respectively. The reflow temperature is related to the material of the respective solder regions 216 and 116 (FIG. 3A), and the reflow temperature may be in the range between about 220° C. and about 255° C. After the reflow process, the temperature of package 10' is lowered, and the resulting solder regions 16, which include the molten solder regions 216 and 116, are solidified. FIGS. 4A and 4B illustrate the structure after the solidification, for example, when package 10' is at room temperature (between about 19° C. and about 23° C., for example).

Since pre-shift factor A in Equation 2 is smaller than 1.0, which means the pre-shift values pre-S (FIGS. 2A and 2B) of electrical connector pairs 112/214 are smaller than, and hence are not enough to compensate for, the misalignment values ΔS (FIGS. 3A and 3B) of the corresponding electrical connector pairs 112/214. As a result, as shown in FIG. 4A, after the reflow process, centers 113 are misaligned from the corresponding centers 213. Furthermore, center 113 shift beyond the corresponding center 213 and shifts to the outer side (the side away from center C100) of the corresponding center 213. Alternatively stated, centers 113 are farther away from center C100 than the corresponding center 213. Throughout the description, misalignment values between the centers 113 and 213 in the same electrical connector pair 112/214 are referred to as post-reflow misalignment values, which are indicated as post-M (identified individually as post-M1, post-M2, etc.). Again, each of the post-reflow misalignment values post-M has a component in the +X or −X direction and a component in the +Y or −Y direction (FIG. 4B). As shown in FIG. 4A, post-reflow misalignment values post-M of different electrical connector pairs 112/214 may be different from each other. For example, post-reflow misalignment value post-M2 is greater than post-reflow misalignment value post-M1.

Since centers 113 are on the outer sides of the corresponding center 213, solder regions 16 may climb on the outer sidewalls (the sidewalls facing away from center C100) of electrical connectors 214. On the other hand, no solder regions 16 will climb on the inner sidewalls (the sidewalls facing toward center C100) of electrical connectors 214. In the top view as shown in FIG. 4B, the outer sidewalls and the corresponding inner sidewalls are opposite to each other, and are aligned to the straight line connecting center C100 to the corresponding electrical connector pair 112/214. Forming solder regions on the outer sidewalls, but not on the inner sidewalls, of electrical connectors 214 has the advantageous feature of reducing strain on the solder region 16 and electrical connectors 112 and 214. The reason is that the outer sides of electrical connectors 214 have higher strain values than the respective inner sides, and increasing the solder volume on the outer side may reduce the higher strain, and may help to protect solder region 16 and electrical connectors 112 and 214 from cracking, peeling, etc.

After the reflow process, underfill 18 is filled between package components 100 and 200. Underfill 18 is in contact with the inner sidewalls of electrical connectors 214, and is separated from the outer sidewalls of electrical connectors 214 by solder region 16. Furthermore, underfill 20 may be dispensed between package components 200 and 300.

Figure 6:
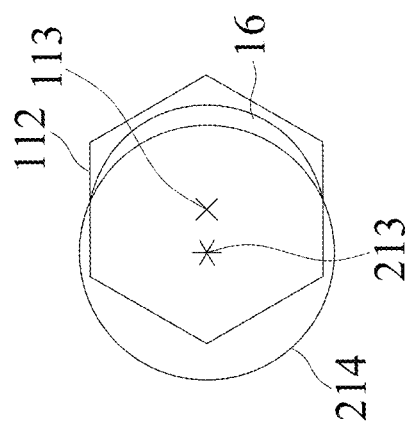
FIG. 6 illustrates a top view of an electrical connector pair and the solder on the outer sidewall of an electrical connector in accordance with some embodiments.

FIG. 6 illustrates a top view of an electrical connector pair 112/214 in accordance with some embodiments. For a clear view purpose, the portions of the solder region 16 at the same level as (the level is viewed in FIG. 4A) electrical connector 214 is illustrated in FIG. 6, and the portion of solder region vertically between (FIG. 4A) electrical connector 214 and the underlying electrical connector 112 are not illustrated in FIG. 6. FIG. 6 shows that the solder region 16 is on the outer sidewall of electrical connector 214 facing away from center C100, while the inner sidewall of electrical connector 214 facing toward center C100 is free from solder region 16.

FIG. 4B illustrates a plane view (atop view, for example) of the package 10' as shown in FIG. 4A. In accordance with some embodiments, centers 113 are shifted away from center C100 relative to their corresponding centers 213. The post-reflow misalignment has a radius pattern, which means the centers 113 and 213 of each of electrical connector pairs 112/214 may be aligned to a straight line connecting center C100 to the electrical connector pair 112/214.

As shown in FIG. 4B, both of the pre-shift values pre-S and post-reflow misalignment values post-M have a component in X-direction and a component in Y-direction, and the components in the X-direction and the components in the Y-direction in combination form the corresponding pre-shift values pre-S and post-reflow misalignment values post-M.

As aforementioned and shown in FIG. 2B, in accordance with some embodiments, the misalignment values ΔS are proportional to the distances S of the corresponding electrical connector pairs 112/214 to center C100. Furthermore, the pre-shift values pre-S are equal to misalignment values ΔS times pre-shift index A. Accordingly, post-reflow misalignment values post-M may be equal to (1−A)*ΔS, and may also be proportional to the distances S of the corresponding electrical connector pairs 112/214 to center C100. For example, when A is in the range between about 0.5 and 0.7, post-reflow misalignment values post-M are equal to about 0.3 to 0.5 of the misalignment values ΔS.

In accordance with alternative embodiments in which Equation 3 is used to calculate the pre-shift values pre-S, the resulting post-reflow misalignment values post-M of different electrical connector pairs 112/214 are the same as each other, regardless of whether they have the same or different distances from center C100 or not. For example, all of the illustrated electrical connector pairs 112/214 in FIG. 4B may have the same magnitude, and may or may not be in the same directions, except the electrical connector pairs 112/214 whose misalignment values ΔS are smaller than the pre-determined Post-M (Equation 3). For these electrical connector pairs 112/214 (which may determine where region 130 (FIG. 3B) is), since they may not be pre-shifted, their post-reflow misalignment values post-M are equal to their misalignment values ΔS. Alternatively stated, in region 130 (FIG. 3B), all electrical connector pairs 112/214 have post-reflow misalignment values post-M proportional to their distance to center C100, and equal to their corresponding misalignment values. Outside of region 130, on the other hand, all electrical connector pairs 112/214 have the same post-reflow misalignment values, which is equal to the pre-determined post-M (Equation 3).

The calculation of misalignment values ΔS and the resulting post-reflow misalignment values post-M may also be stated alternatively as follows. In accordance with some embodiments, as discussed in preceding paragraphs, after the misalignment values ΔS are determined either through experiment using physical packages or through simulation, each of misalignment values ΔS is allocated as two portions, with one portion as being the pre-shift value pre-S, which is equal to A*ΔS. The other portion is the intended post-reflow misalignment value post-M. Experiment results have revealed that post-reflow misalignment value post-M needs to be in certain range. When post-reflow misalignment value post-M is too large, there is the possibility of cold joint (no-joining) of solder regions or bridging of solder regions to neighboring un-intended electrical connectors. When post-reflow misalignment value post-M is too small, the effect of reducing strain in solder regions is not adequate. Accordingly, the post-reflow misalignment values of the corner-most electrical connector pairs 112/214 are designed to be in the range between about ⅕ and about ¼ of the critical dimension (CD) (also shown as width W1 in FIG. 4B) of electrical connectors 214 (FIG. 4A). Since the corner-most electrical connector pairs 112/214 are closest to the corners of package component 100, and hence suffer from greater strain than any other electrical connector pairs, having the post-reflow misalignment values of the corner-most electrical connector pairs 112/214 in ⅕(W1) to ¼(W1) may maximize the benefit and minimize problems.

Figure 5:
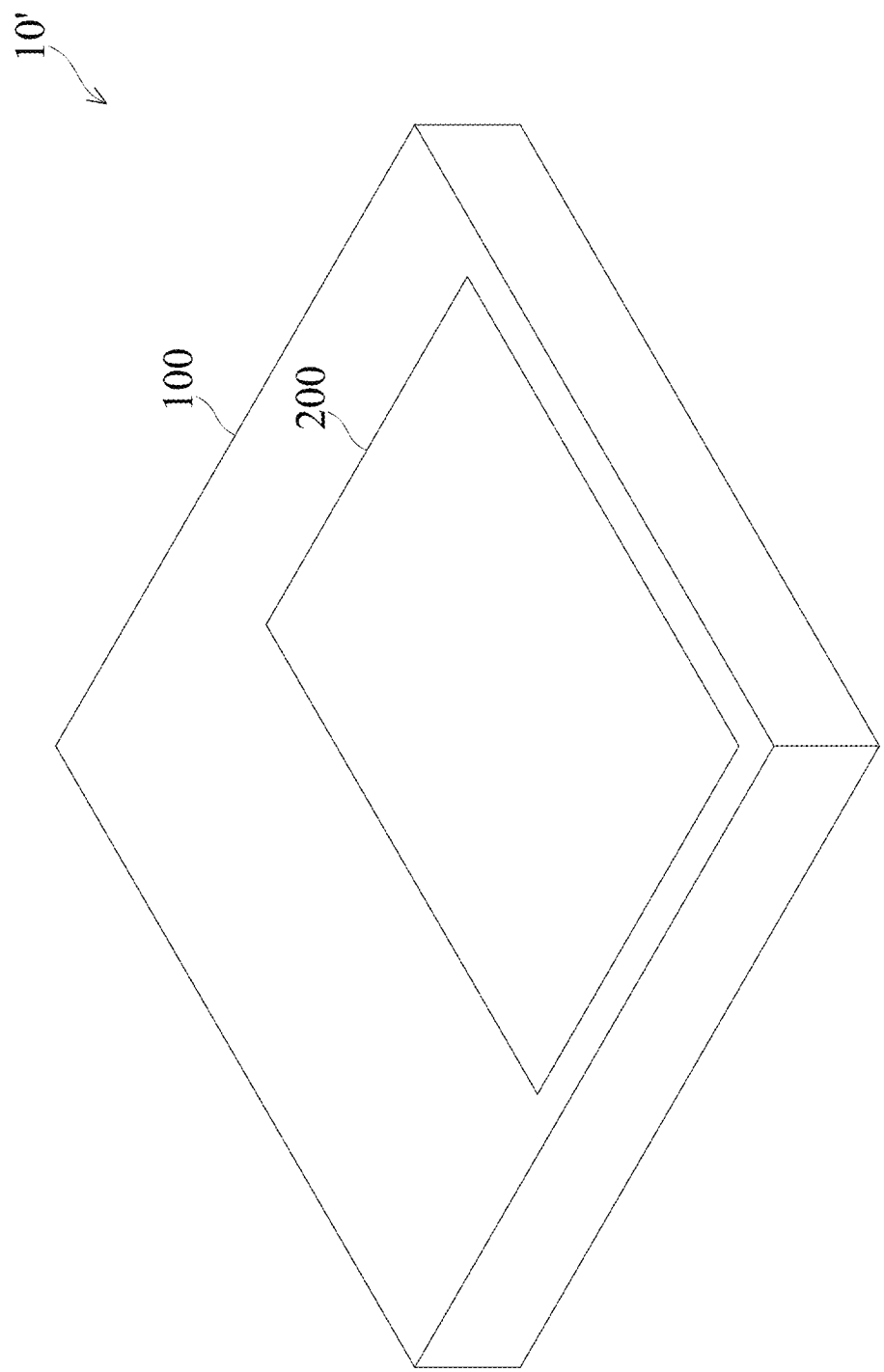
FIG. 5 illustrates an example of a heterogeneous package in accordance with some embodiments.

In above-discussed embodiments, package 10' is essentially homogeneously, which means the CTE values of different parts of package components 100 and 200 are close to each other, for example, with a variation smaller than about 10 percent of the CTEs of the respective package components 100 and 200. For example, when package component(s) 200 substantially cover(s) an entirety of package component 100, and the materials and patterns of package component 100 and 200 are uniform, package 10' is homogenous. Accordingly, the pre-shift values pre-S and post-reflow misalignment values post-M may be calculated based on the distances of the electrical connector pairs 112/214 and the CTEs CTE100 and CTE200. In accordance with other embodiments, package 10' is heterogeneous. For example, FIG. 5 illustrates package 10' with package component 200 covering a portion, but not all, of package component 100, and there is a significant part (for example, more than 20 percent or 30 percent) of package component 100 not covered by package component 200. Also, package component 200 is significantly offset from the center of package component 100. Accordingly, the portion of package 10' including package component 200 has a different CTE than the portion of package 10' not including package component 200. In accordance with these embodiments, the formation of the packages may include the following steps.

First, the positions of electrical connector pairs 112/214 in the resulting package are determined, which correspond to the structure in FIG. 1, except the package components 100 and 200 in combination are heterogeneous. Next, a simulation is performed using finite-element modeling. In the modeling, the structure, the materials, and the reflow conditions are used as input parameters. The misalignment values ΔS (including components in X-directions and Y-directions) of each of the electrical connector pairs 112/214 are determined. In these embodiments, the misalignment may not have the pattern of radiation from center C100. Next, based on the misalignment values ΔS, pre-shift value pre-S for each of electrical connector pairs 112/214 is calculated. The calculation includes determining the intended post-reflow misalignment values post-M, and subtracting the intended post-reflow misalignment values post-M from the simulated misalignment values ΔS to generate pre-shift values pre-S (including components in X-direction and Y-direction) for each of the electrical connector pairs 112/214. After the pre-shift values pre-S are calculated, package components 100 and/or 200 are re-designed to implement the pre-shift values pre-S as calculated. The redesigned package components 100 and 200 may then be manufactured and bonded through reflow.

In above-illustrated embodiments, some processes and features are discussed in accordance with some embodiments of the present disclosure to form a three-dimensional (3D) package. Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

In the example embodiments as discussed, the CTE CTE100 of package component 100 is greater than the CTE CTE200 of package component 200. It is appreciated that the embodiments of the present disclosure may also apply to the situations in which the CTE CTE100 of package component 100 is smaller than the CTE CTE200 of package component 200. The processes are similar to above-discussed, except that in these embodiments, electrical connectors 112 will pre-shift away from center C100 than electrical connectors 214, and the post-reflow shift of electrical connectors 112 will be toward the center C100 than the corresponding electrical connectors 214.

The embodiments of the present disclosure have some advantageous features. By determining the pre-shift values and post-reflow misalignment values, the strain on solder regions/bumps may be reduced, and the cold joint problem and bridging problem may also be reduced.

In accordance with some embodiments of the present disclosure, a method includes determining locations for first electrical connectors of a first package component and second electrical connectors in a second package component, wherein the first electrical connectors and the second electrical connectors having the same locations are electrical connector pairs; determining misalignment values of the first electrical connectors and the second electrical connectors in response to reflow processes for bonding the first package component to the second package component; calculating pre-shift values for each of the electrical connector pairs based on the misalignment values; modifying locations of the first electrical connectors and the second electrical connectors to generate modified designs, wherein the locations of the first electrical connectors and the second electrical connectors in same electrical connector pairs are shifted from each other by the pre-shift values; manufacturing the first package component and the second package component, with the first electrical connectors and the second electrical connectors having the modified designs; and performing a reflow process to bond the first package component to the second package component. In an embodiment, for each of the electrical connector pairs, a corresponding pre-shift value is calculated as being smaller than a corresponding misalignment value. In an embodiment, after the reflow process, the first electrical connectors are misaligned from corresponding second electrical connectors in the same electrical connector pairs by a post-reflow misalignment value. In an embodiment, the post-reflow misalignment value is in a range greater than ⅕ of a width of the first electrical connectors and less than ¼ of the width. In an embodiment, before the reflow process, the first electrical connectors are closer to a center of the first package component than corresponding second electrical connectors in the same electrical connector pairs, and after the reflow process, the first electrical connectors are farther away from the center of the first package component than the corresponding second electrical connectors in the same electrical connector pairs. In an embodiment, in the modified designs, the first electrical connectors are shifted away from or toward a center of the first package component than corresponding second electrical connectors in the same electrical connector pairs. In an embodiment, the first package component has a greater coefficient of thermal expansion than the second package component, and wherein the first electrical connectors are shifted toward the center of the first package component than the corresponding second electrical connectors in the same electrical connector pairs. In an embodiment, the pre-shift values are calculated as products of the misalignment values and an index, and the index is greater than 0 and smaller than 1.

In accordance with some embodiments of the present disclosure, a structure includes a first package component comprising a first electrical connector; a second package component comprising a second electrical connector; a first solder bump joining the first electrical connector to the second electrical connector, wherein a first center of the first electrical connector is misaligned from a second center of the second electrical connector by a first post-reflow misalignment value; a third electrical connector in the first package component; a fourth electrical connector in the second package component, wherein the third electrical connector and the fourth electrical connector are closer to an additional center of the first package component than the first electrical connector and the second electrical connector, and a third center of the third electrical connector is misaligned from a fourth center of the fourth electrical connector by a second post-reflow misalignment value smaller than the first post-reflow misalignment value; and a second solder bump joining the third electrical connector to the fourth electrical connector. In an embodiment, the first electrical connector protrudes beyond a surface of the first package component, and the first electrical connector comprises a first sidewall facing away from a center of the first package component, wherein the first solder bump contacts the first sidewall; and a second sidewall facing toward the center of the first package component, wherein the first solder bump is spaced apart from the second sidewall. In an embodiment, the structure further comprises an underfill between the first package component and the second package component, wherein the underfill contacts the second sidewall of the first electrical connector. In an embodiment, the first post-reflow misalignment value is in a range between about ⅕ and about ¼ of a critical dimension of the first electrical connector. In an embodiment, the first center is shifted from the second center in a direction pointing from an additional center of the first package component to the first center. In an embodiment, the first package component has a greater coefficient of thermal expansion than the second package component, and wherein the first center is farther away from the additional center of the first package component than the second center. In an embodiment, a first ratio of the first post-reflow misalignment value to a first distance is equal to a second ratio of the second post-reflow misalignment value to a second distance, wherein the first distance between the first electrical connector and an additional center of the first package component, and the second distance is between the third electrical connector and the additional center.

In accordance with some embodiments of the present disclosure, a structure includes a first package component comprising a first conductive pad; a second package component overlying the first package component, the second package component comprising a surface dielectric layer; a first conductive bump protruding lower than the surface dielectric layer, wherein the first conductive bump comprises a first sidewall facing away from a center of the first package component, and a second sidewall facing toward the center; a solder bump joining the first conductive pad to the first conductive bump, wherein the solder bump contacts the first sidewall; and an underfill between the first package component and the second package component, wherein the underfill contacts the second sidewall. In an embodiment, a first center of the first conductive pad is farther away from the center of the first package component than a second center of the first conductive bump by a first post-reflow misalignment value. In an embodiment, the structure further comprises a second conductive pad in the first package component; and a second conductive bump in the second package component, wherein the second conductive pad and the second conductive bump are closer to the center of the first package component than the first conductive pad and the first conductive bump, and a third center of the second conductive pad is misaligned from a fourth center of the second conductive bump by a second post-reflow misalignment value smaller than the first post-reflow misalignment value. In an embodiment, the first post-reflow misalignment value is in a range between about 20 percent to about 25 percent of a critical dimension of the first conductive bump. In an embodiment, the second package component has a greater coefficient of thermal expansion than the first package component.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   forming a first package component comprising a first electrical connector, wherein the first electrical connector has a first distance from a package center of the first package component;
   forming a second package component comprising a second electrical connector;
   placing the second package component on the first package component, wherein the second electrical connector is separated from the first electrical connector by a solder region, with both of the first electrical connector and the second electrical connector contacting the solder region, and wherein the second electrical connector is farther away from the package center of the first package component than the first electrical connector by a first pre-shift value; and with the second package component being placed on the first package component and farther away from the package center, reflowing the solder region, wherein at a time after the reflowing, the second electrical connector is joined to the first electrical connector through the solder region, and the second electrical connector is closer to the package center than the first electrical connector by a first post-reflow misalignment value.

2. The method of claim 1, wherein the first pre-shift value is equal to the first post-reflow misalignment value.

3. The method of claim 1, wherein the forming the first package component comprises forming a package substrate, and the forming the second package component comprises forming an interposer.

4. The method of claim 1, wherein the first package component comprises an organic substrate, and the second package component comprises a silicon substrate.

5. The method of claim 1 further comprising estimating a misalignment value of the second electrical connector relative to the first electrical connector caused by the reflowing, wherein the first pre-shift value is selected to be a value that is smaller than the misalignment value.

6. The method of claim 5, wherein the first post-reflow misalignment value is in a range greater than ⅕ of a width of the first electrical connectors and less than ¼ of the width.

7. The method of claim 5, wherein the estimating comprises simulating.

8. The method of claim 1, wherein the first package component further comprises a third electrical connector having a second distance from the package center, with the second distance being greater than the first distance, and the second package component further comprises a fourth electrical connector over and electrically connecting to the third electrical connector, and wherein after the reflowing, the fourth electrical connector is laterally shifted from the third electrical connector by a second post-reflow misalignment value.

9. The method of claim 8, wherein the second post-reflow misalignment value is greater than the first post-reflow misalignment value.

10. The method of claim 9, wherein a first ratio of the second distance to the first distance is equal to a second ratio of the second post-reflow misalignment value to the first post-reflow misalignment value.

11. A method comprising:
forming a first package component comprising a first electrical connector and a second electrical connector, wherein the second electrical connector is farther away from a package center of the first package component than the first electrical connector;
forming a second package component comprising a third electrical connector and a fourth electrical connector; and
bonding the first package component to the second package component through:
a first solder bump joining the first electrical connector to the third electrical connector, wherein before the bonding, the third electrical connector is laterally shifted from the first electrical connector in a first direction by a first pre-shift value, and after the bonding, the third electrical connector is laterally shifted from the first electrical connector in a second direction opposite to the first direction by a first post-reflow misalignment value, and wherein one of the first direction and the second direction points from a center of the first package component to the first electrical connector; and
a second solder bump joining the second electrical connector to the fourth electrical connector.

12. The method of claim 11, wherein the first pre-shift value is equal to the first post-reflow misalignment value.

13. The method of claim 11, wherein:
before the bonding, the fourth electrical connector is laterally shifted from the second electrical connector in the first direction by a second pre-shift value; and
after the bonding, the fourth electrical connector is laterally shifted from the second electrical connector in the second direction by a second post-reflow misalignment value.

14. The method of claim 13, wherein the second post-reflow misalignment value is greater than the first post-reflow misalignment value.

15. The method of claim 13, wherein the first electrical connector and the second electrical connector have a first distance and a second distance, respectively, from the package center, and wherein a first ratio of the second distance to the first distance is equal to a second ratio of the second post-reflow misalignment value to the first post-reflow misalignment value.

16. The method of claim 13 further comprising dispensing an underfill between the first package component and the second package component, wherein the underfill is in direct contact with the first electrical connector.

17. The method of claim 13, wherein the first post-reflow misalignment value is in a range between about ⅕ and about ¼ of a critical dimension of the third electrical connector.

18. A method comprising:
forming a first package component comprising a first conductive pad;
forming a second package component comprising a first conductive bump;
placing the second package component over and aligned to the first package component, wherein the first conductive bump partially overlaps the first conductive pad, and wherein a first center of the first conductive pad is laterally offset from a second center of the first conductive bump in a first direction; and
after the placing the second package component, performing a reflow process to bond the first conductive pad to the first conductive bump through a solder bump, wherein after the reflow process, the first center of the first conductive pad is laterally offset from the second center of the first conductive bump in a second direction opposite to the first direction.

19. The method of claim 18, wherein both of the first direction and the second direction overlap a straight line that extends from the first center to a package center of the first package component.

20. The method of claim 18, wherein the first package component comprises a second conductive pad spaced apart from a package center of the first package component, and the second package component comprises a second conductive bump, wherein the placing the second package component over the first package component results in the second conductive bump to overlap the second conductive pad, and a third center of the second conductive pad is vertically aligned to the second conductive bump.

* * * * *